United States Patent
Rajagopal et al.

(10) Patent No.: US 10,411,780 B2
(45) Date of Patent: Sep. 10, 2019

(54) FAST ASSOCIATION IN MILLIMETER WAVE WIRELESS LOCAL AREA NETWORK SYSTEMS

(71) Applicant: Samsung Electronics Co., LTD, Suwon-si (KR)

(72) Inventors: Sridhar Rajagopal, Mountain View, CA (US); Rakesh Taori, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 14/757,415

(22) Filed: Dec. 23, 2015

(65) Prior Publication Data

US 2016/0191132 A1 Jun. 30, 2016

Related U.S. Application Data

(60) Provisional application No. 62/098,832, filed on Dec. 31, 2014.

(51) Int. Cl.
*H04B 7/06* (2006.01)
*H04B 7/08* (2006.01)
*H04W 72/04* (2009.01)

(52) U.S. Cl.
CPC .......... *H04B 7/063* (2013.01); *H04B 7/0695* (2013.01); *H04B 7/088* (2013.01); *H04W 72/046* (2013.01)

(58) Field of Classification Search
CPC ...... H04B 7/063; H04B 7/0695; H04B 7/088; H04W 72/046
See application file for complete search history.

(56) References Cited

U.S. PATENT DOCUMENTS

| | | | |
|---|---|---|---|
| 8,335,167 B1 * | 12/2012 | Zhang | H04B 7/0626 370/252 |
| 8,509,130 B2 * | 8/2013 | Liu | H04B 7/0695 342/367 |

(Continued)

OTHER PUBLICATIONS

IEEE Std. 802.11—2012; "Part 11: Wireless LAN Medium Access Control MAC and Physical Layer (PHY) Specification, Amendment 3 Enhancements for Very High Throughput in the 60 GHz Band", Dec. 28, 2012, New York; 628 pgs.

(Continued)

*Primary Examiner* — Mounir Moutaouakil

(57) ABSTRACT

Methods and apparatuses for association in a beamformed wireless area network (WLAN) are provided. A method for operating a station (STA) includes randomly selecting a plurality of sector sweep frames for association beam transmission within a frame-aligned transmit sector sweep duration in an association beamforming training duration of a beacon interval, transmitting a beam in each of the randomly selected sector sweep frames, and receiving sector sweep feedback from an access point (AP). A method for operating the AP includes receiving at least one transmission from one or more STAs on at least one of randomly selected sector sweep frames within the frame-aligned transmit sector sweep duration, selecting a sector identifier for transmissions from each of the one or more STAs based on the at least one received transmission, and transmitting grouped sector sweep feedback indicating the selected sector identifier for transmissions from each of the one or more STAs.

18 Claims, 16 Drawing Sheets

(56) References Cited

U.S. PATENT DOCUMENTS

| | | | |
|---|---|---|---|
| 9,148,842 B2* | 9/2015 | Qi | H04W 48/10 |
| 2010/0214169 A1 | 8/2010 | Kafle | |
| 2010/0215027 A1* | 8/2010 | Liu | H04B 7/0695 |
| | | | 370/338 |
| 2010/0265925 A1 | 10/2010 | Liu et al. | |
| 2011/0064033 A1 | 3/2011 | Gong et al. | |
| 2011/0080898 A1* | 4/2011 | Cordeiro | H04B 7/0617 |
| | | | 370/338 |
| 2011/0255455 A1* | 10/2011 | Seok | H04W 36/06 |
| | | | 370/311 |
| 2013/0044695 A1* | 2/2013 | Xu | H04B 7/0619 |
| | | | 370/329 |
| 2013/0252548 A1 | 9/2013 | Levy et al. | |
| 2013/0315325 A1* | 11/2013 | Wang | H04B 7/043 |
| | | | 375/267 |
| 2014/0071956 A1* | 3/2014 | Park | H04W 72/0406 |
| | | | 370/336 |
| 2015/0230263 A1* | 8/2015 | Roy | H04W 16/28 |
| | | | 455/452.2 |
| 2016/0054433 A1* | 2/2016 | Barrow | G01S 7/34 |
| | | | 342/92 |
| 2016/0249269 A1* | 8/2016 | Niu | H04W 56/0095 |
| 2016/0255660 A1* | 9/2016 | Son | H04B 7/0491 |
| | | | 370/329 |
| 2016/0285583 A1* | 9/2016 | Kasher | H04L 1/0001 |
| 2017/0126302 A1* | 5/2017 | Sanderovich | H04B 7/0682 |
| 2017/0223552 A1* | 8/2017 | Roy | H04W 16/14 |

OTHER PUBLICATIONS

Tsang, et. el.; "Fast Beam Training for mmWave Communication System: from Algorithm to Circuits"; mmCom '10, Sep. 24, 2010, 5 pgs.

Wang, et al.; "Beam Codebook Based Beamforming Protocol for Multi-Gbps Millimeter-Wave WPAN Systems"; IEEE Journal, vol. 27, No. 8, Oct. 2009, 10 pgs.

International Search Report and Written Opinion issued for PCT/KR2015/014426 dated Apr. 21, 2016, 11 pgs.

Rajagopal et al., "MIMO Designs for mmWave Wireless LAN Systems", Signals, Systems and Computers, 2014 48th Asilomar Conference on Signals, Systems and Computers Conference on Nov. 2-5, 2014, 8 pgs.

Extended European Search Report for European Application No. 15875683.3, dated Nov. 22, 2017. (13 pages).

Rajogopal, et al., "MIMO designs for mmWave wireless LAN systems", 2014 48th Asilomar Conference on Signals, Systems and Computers, IEEE, Nov. 2, 2014, pp. 1916-1920. (5 pages).

"ISO/IEC/IEEE International Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements", IEEE Standard, IEEE, Piscataway, NJ, USA, Mar. 14, 2014 (Mar. 14, 2014), pp. 1-634, XP068070330. (634 pages).

Office Action dated Jan. 17, 2019 in connection with European Patent Application No. 15 875 683.3, 5 pages.

* cited by examiner

FAST ASSOCIATION IN MILLIMETER WAVE WIRELESS LOCAL AREA NETWORK SYSTEMS

CROSS-REFERENCE TO RELATED APPLICATION(S) AND CLAIM OF PRIORITY

This application claims priority to U.S. Provisional Patent Application No. 62/098,832 entitled "METHOD AND APPARATUS TO ENABLE FAST ASSOCIATION IN MILLIMETER WAVE WIRELESS LAN SYSTEMS" filed on Dec. 31, 2014. The above-identified provisional patent application is hereby incorporated by reference in its entirety.

TECHNICAL FIELD

This disclosure relates generally to beamformed wireless systems millimeter wave (mmWave) wireless local area network (WLAN) systems. More specifically, this disclosure relates to association in millimeter wave (mmWave) wireless local area network (WLAN)/personal area network (PAN) systems.

BACKGROUND

IEEE 802.11ad provides an association mechanism for attachment of a station (STA) or node to an access point (AP), or more generally to another STA. Some beamformed mmWave wireless networks are configured around accommodating a small number of users or stations (STAs). In some beamformed mmWave wireless networks, association for large number of STAs can be a time and power consuming process as a function of an inefficient beam association procedure. In some beamformed mmWave wireless networks, the above-described time and power inefficiencies can be made worse as the number of STAs in the network is increased.

SUMMARY

Embodiments of the present disclosure provide fast association in mmWave WLAN systems.

In one embodiment, an apparatus for association by a STA in a beamformed WLAN is provided. The apparatus includes a controller and a transceiver. The controller is configured to randomly select a plurality of sector sweep frames for association beam transmission within a frame-aligned transmit sector sweep duration in an association beamforming training duration of a beacon interval. The transceiver is configured to transmit a beam in each of the randomly selected sector sweep frames and receive sector sweep feedback from AP.

In another embodiment, an apparatus for association by an AP in a beamformed WLAN is provided. The apparatus includes a controller and a transceiver. The transceiver is configured to receive at least one transmission from one or more STAs on at least one of randomly selected sector sweep frames within a frame-aligned transmit sector sweep duration in an association beamforming training duration of a beacon interval. The controller is configured to select a sector identifier for transmissions from each of the one or more STAs based on the at least one received transmission. The transceiver is further configured to transmit, to the one or more STAs, grouped sector sweep feedback indicating the selected sector identifier for transmission from each of the one or more STAs.

A method for association by a STA in a beamformed WLAN is provided. A method for operating a station (STA) includes randomly selecting a plurality of sector sweep frames for association beam transmission within a frame-aligned transmit sector sweep duration in an association beamforming training duration of a beacon interval. The method further includes transmitting a beam in each of the randomly selected sector sweep frames and receiving sector sweep feedback from an access point (AP).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure provide an efficient method for associating multiple users in a mmWave WLAN system. Embodiments of the present disclosure recognize that operations for association which were repeated sequentially for attaching one user after the other can now be used to attach multiple users in a single sequence of operation. Embodiments of the present disclosure provide a faster and a more robust association method for multiple STAs in a WLAN. Embodiments of the present disclosure provide support of fast association but in a backward compatible manner to IEEE 802.11ad. Embodiments of the present disclosure can improve the probability of association and decrease average association latency.

Figure 1:
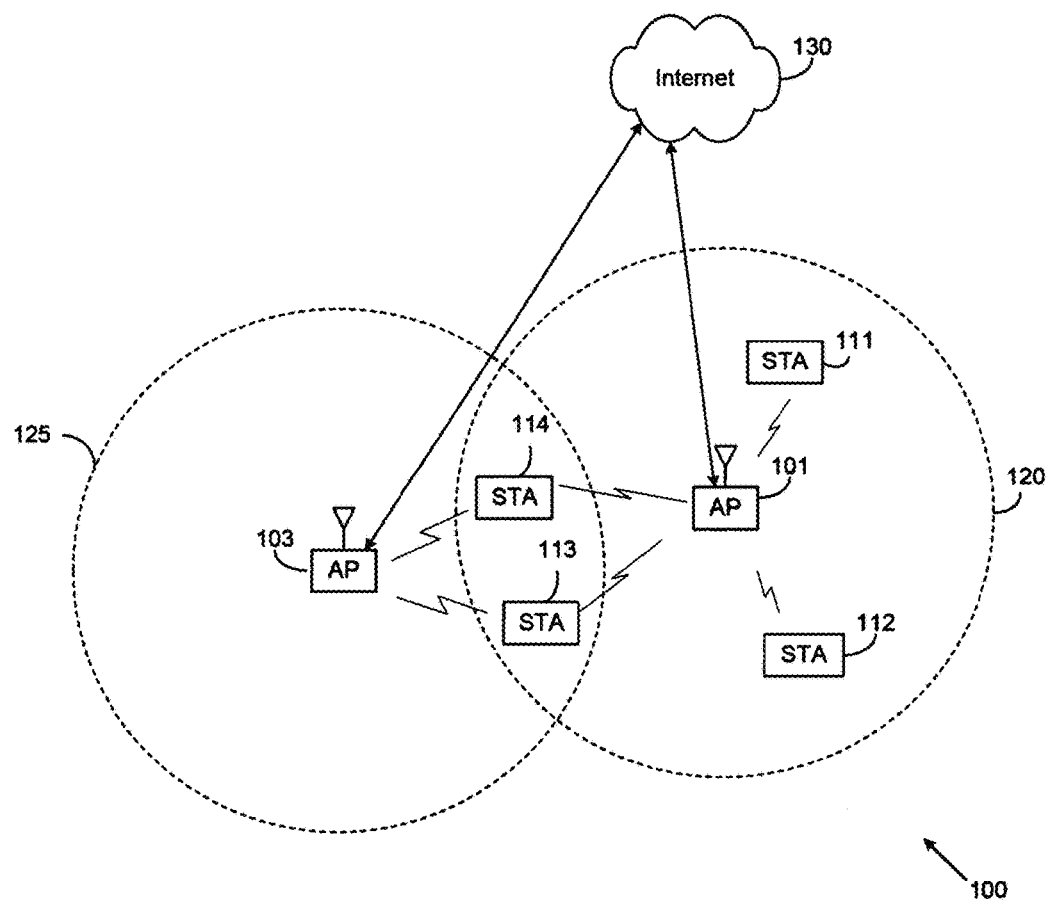
FIG. 1 illustrates an example wireless network according to illustrative embodiments of the present disclosure.

FIG. 1 illustrates an example wireless network 100 according to according to illustrative embodiments of the present disclosure. The embodiment of the wireless network 100 shown in FIG. 1 is for illustration only. Other embodiments of the wireless network 100 could be used without departing from the scope of this disclosure.

As illustrated in FIG. 1, the wireless network 100 includes APs 101 and 103. The APs 101 and 103 communicate with at least one network 130, such as the Internet, a proprietary Internet Protocol (IP) network, or other data network.

The AP 101 provides wireless access to the network 130 for a plurality of stations (STAs) 111-114 within a coverage area 120 of the AP 101. The APs 101-103 may communicate with each other and with the STAs 111-114 using WiFi or other WLAN communication techniques.

Depending on the network type, other well-known terms may be used instead of "access point" or "AP," such as "router" or "gateway." For the sake of convenience, the term "AP" is used in this patent document to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this patent document to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programing for enabling fast association in mmWave WLAN systems. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2:
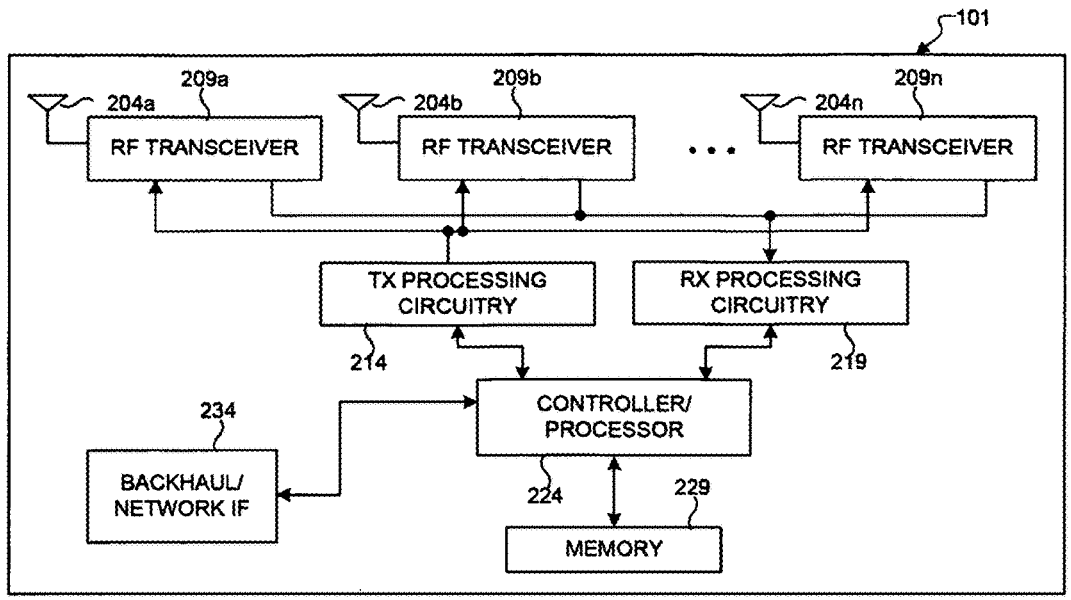
FIG. 2 illustrates an example AP according to illustrative embodiments of the present disclosure.

FIG. 2 illustrates an example AP 101 according to illustrative embodiments of the present disclosure. The embodiment of the AP 101 illustrated in FIG. 2 is for illustration only, and the AP 103 of FIG. 1 could have the same or similar configuration. However, APs come in a wide variety of configurations, and FIG. 2 does not limit the scope of this disclosure to any particular implementation of an AP.

As shown in FIG. 2, the AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234.

The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. Any of a wide variety of other functions could be supported in the AP 101 by the controller/processor 224. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 101 may include circuitry and/or programing for enabling fast association in mmWave WLAN systems. Although FIG. 2 illustrates one example of AP 101, various changes may be made to FIG. 2. For example, the AP 101 could include any number of each component shown in FIG. 2. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2 could be combined, further subdivided, or omitted and additional components could be added according to particular needs.

Figure 3:
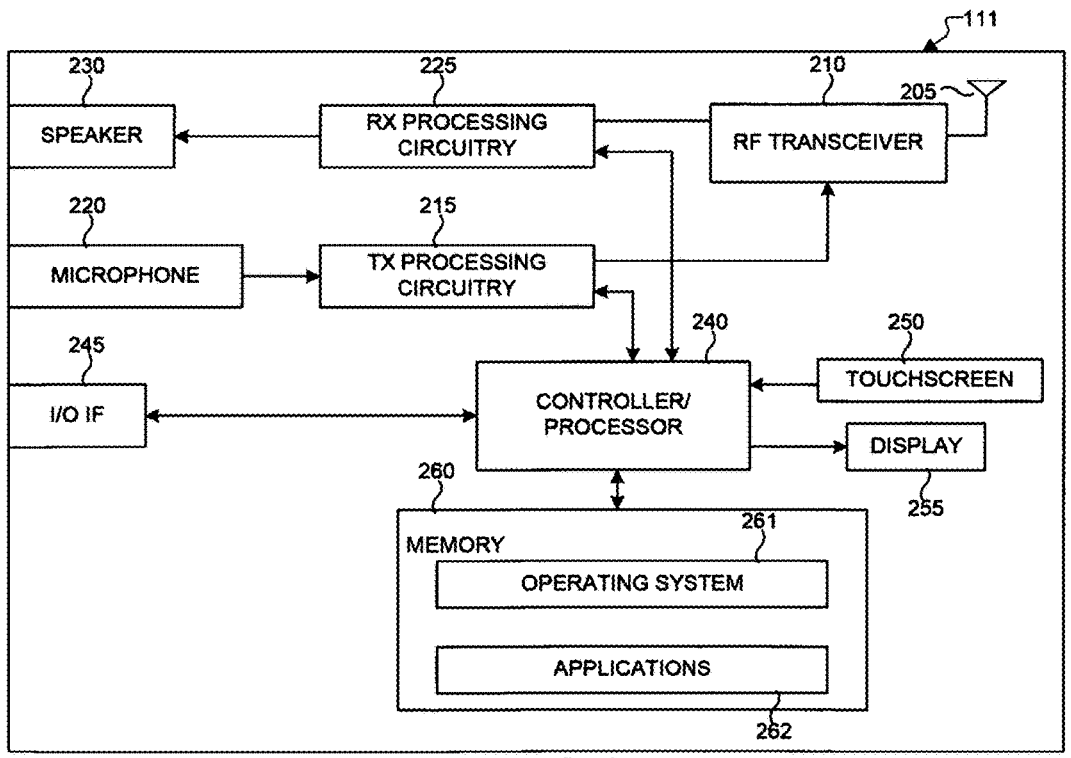
FIG. 3 illustrates an example STA according to illustrative embodiments of the present disclosure.

FIG. 3 illustrates an example STA 111 according to illustrative embodiments of the present disclosure. The embodiment of the STA 111 illustrated in FIG. 3 is for illustration only, and the STAs 111-115 of FIG. 1 could have the same or similar configuration. However, STAs come in a wide variety of configurations, and FIG. 3 does not limit the scope of this disclosure to any particular implementation of a STA.

As shown in FIG. 3, the STA 111 includes an antenna 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide fast association in mmWave WLAN systems. In some embodiments, the controller/processor 240 includes at least one microprocessor or microcontroller.

The controller/processor 240 is also capable of executing other processes and programs resident in the memory 260, such as operations for management of UL MU transmissions in WLANs. The controller/processor 240 can move data into or out of the memory 260 as required by an executing process. In some embodiments, the controller/processor 240 is configured to execute a plurality of applications 262, such as applications for MU communications, including management of UL MU transmissions in WLANs. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites.

The memory 260 is coupled to the controller/processor 240. Part of the memory 260 could include a random access memory (RAM), and another part of the memory 260 could include a Flash memory or other read-only memory (ROM).

Although FIG. 3 illustrates one example of STA 111, various changes may be made to FIG. 3. For example, various components in FIG. 3 could be combined, further subdivided, or omitted and additional components could be added according to particular needs. In particular examples, the STA 111 may not include voice communication or the controller/processor 240 could be divided into multiple processors, such as one or more central processing units (CPUs) and one or more graphics processing units (GPUs). Also, while FIG. 3 illustrates the STA 111 configured as a mobile telephone or smartphone, STAs could be configured to operate as other types of mobile or stationary devices.

Figure 4:
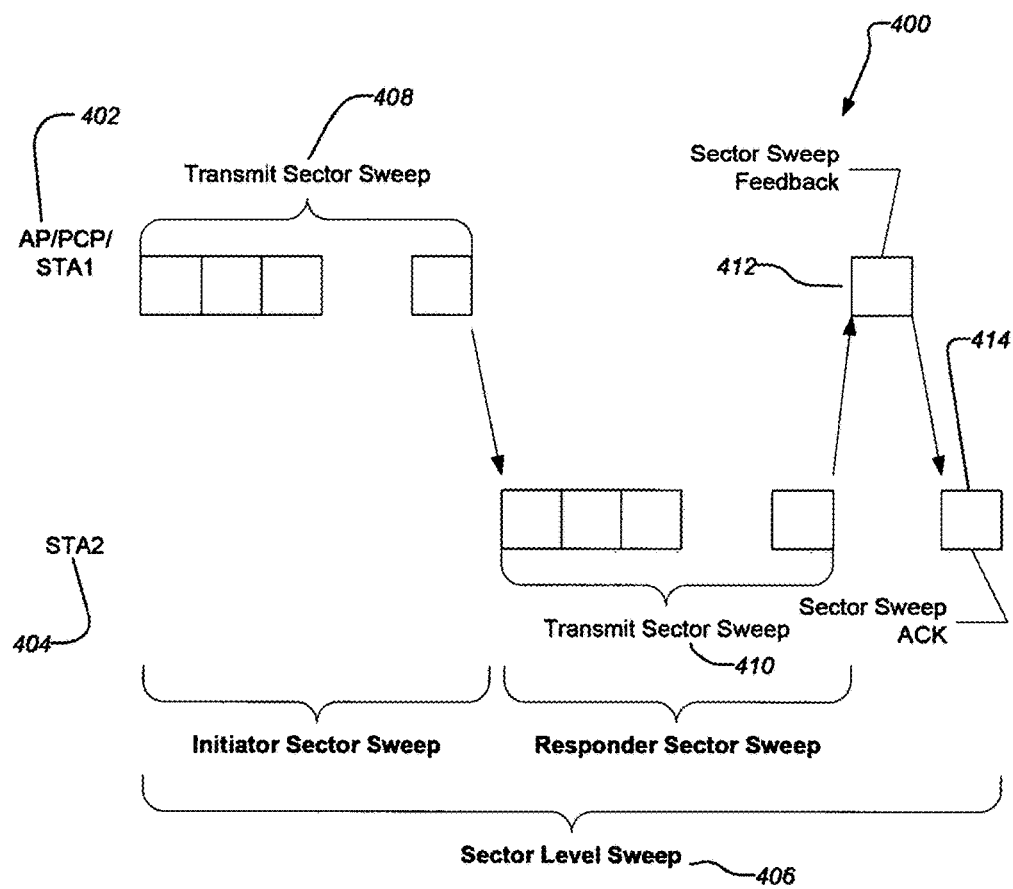
FIG. 4 illustrates an example beamforming procedure according to the present disclosure.

FIG. 4 illustrates an example beamforming (BF) procedure 400 for IEEE 802.11ad for a node 402 such as an Access Point (AP), personal basic service set (PBSS) control point (PCP) or a station (STA)) to initiate the attachment with another STA 404. In this case, the node 402 includes an AP 102 and the STA 404 includes a STA2 106. The BF procedure includes a bidirectional sequence of BF training frame transmissions that uses sector sweep and provides the necessary signaling to allow each STA to determine appropriate antenna system settings for both transmission and reception. BF training starts with a sector level sweep (SLS) 406 from the initiator. In this case, the initiator is the node 402. The purpose of the SLS 406 phase is to enable communications between the two participating STAs at the control PHY rate or higher MCS. Normally, the SLS 406 phase provides only transmit BF training. At the start of the transmit sector sweep 408, the responder, in this case station 404, should have its receiving antenna configured to a wide beam (e.g. quasi-omni) pattern, followed by transmit sector sweep 410 by the responder. At the end of the sector sweep phase, both the node 402 and the STA2 402 (e.g. AP/PCP and STA) will have completed the transmit beamforming and the best sector is fed back for use in data communication. In this case, the sector sweep phase is followed by the node 402 transmitting a sector sweep feedback 412 to which the STA 404 responds by transmitting a sector sweep acknowledgement (ACK) 414. A beam refinement protocol (BRP) may follow, if requested by either the initiator or the responder.

Figure 5:
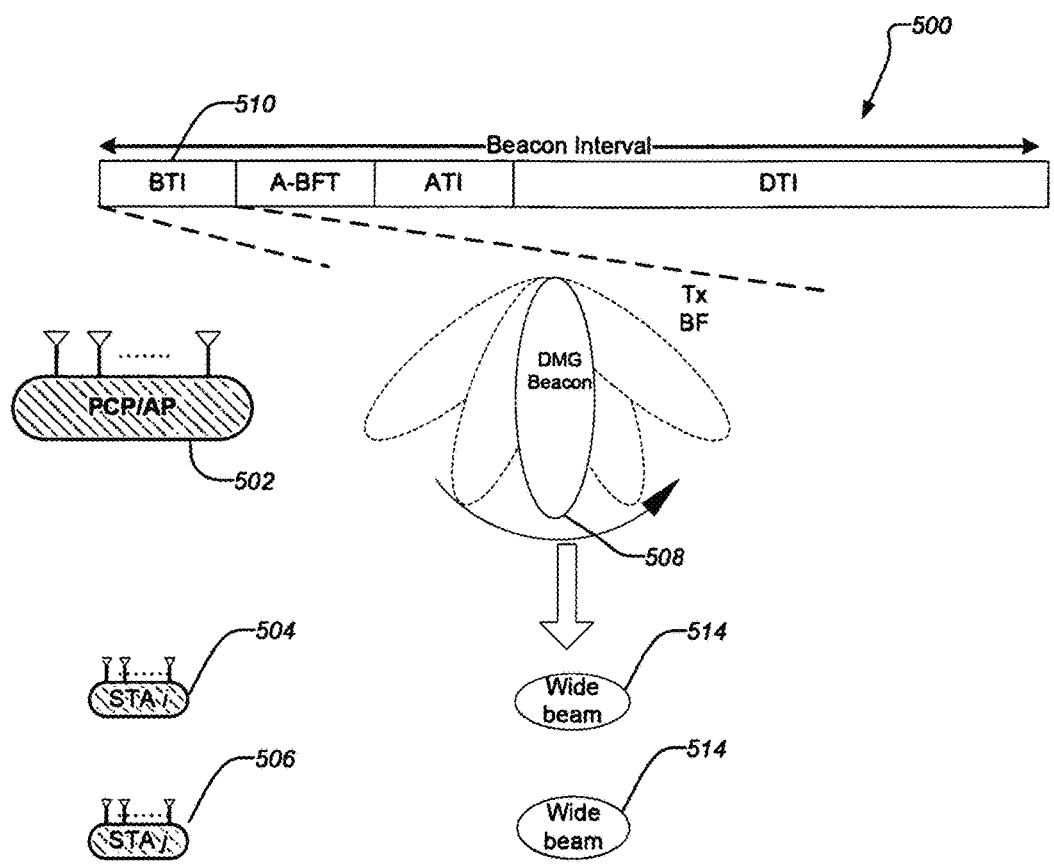
FIG. 5 illustrates an example directional multi-gigabit (DMG) beaconing procedure according to the present disclosure.

FIG. 5 illustrates an example DMG beaconing procedure for IEEE 802.11ad according to this disclosure. The embodiment of the beaconing procedure shown in FIG. 5 is for illustration only, and other beaconing procedures in embodiments of the present disclosure could have the same or similar configuration.

FIG. 5 illustrates an example beaconing procedure 500 for IEEE 802.11ad to start the STA association procedure. Though the terms AP/PCP and STA are used for nodes of the beaconing procedure 500, for purposes of discussion of FIG. 5, the terms can be used interchangeably. In certain embodiments a node 502 includes an AP 102, a node 504 includes a STA1 104, and a node 506 includes a STA2 106.

The AP/PCP or node 502 starts transmitting beacons, in this case, directional multi-gigabit (DMG) beacons 508, using a transmit sector sweep during the beacon transmission interval (BTI) 510. All STAs, such as nodes 504 and 506, that wish to associate with the PCP/AP are in their receive mode during this transmission using a wide pattern 514 or quasi-omni pattern. Each STA, namely nodes 504 and 506, record the best directions for reception from the PCP/AP or node 502 and feeds back the direction information to the PCP/AP or node 502 during the association process.

Figure 6:
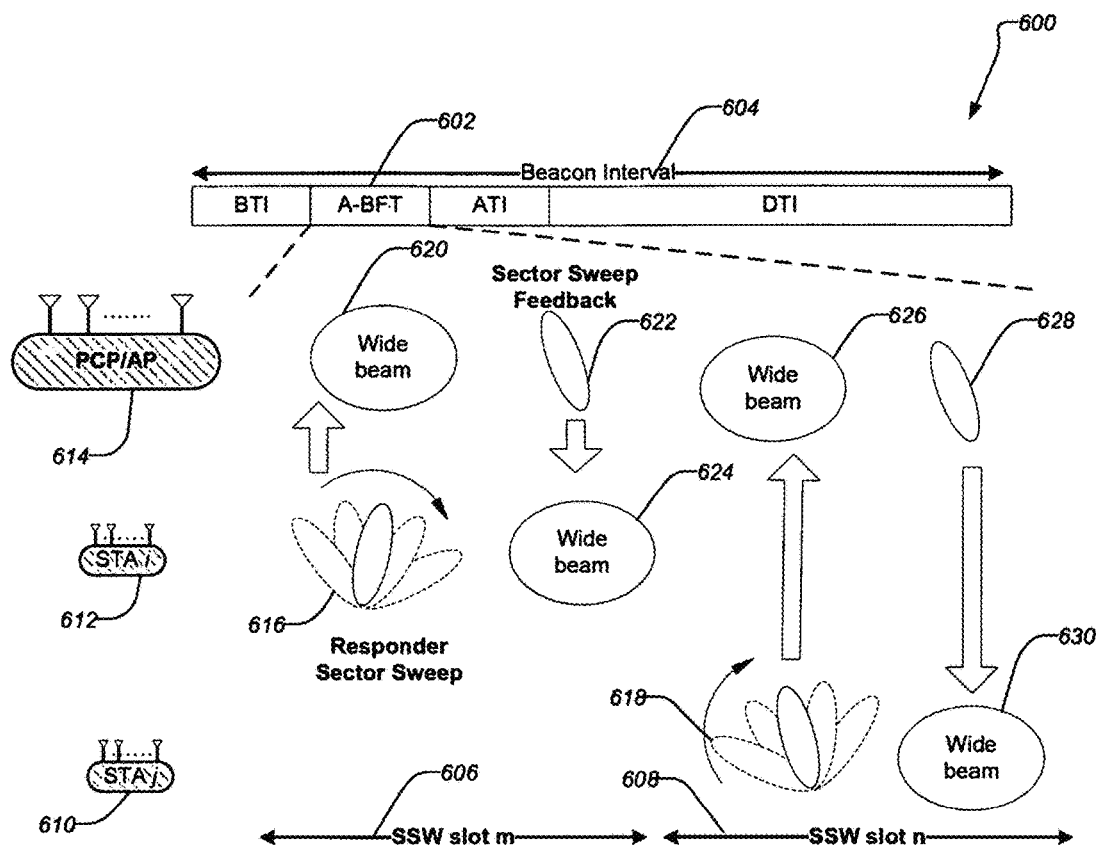
FIG. 6 illustrates an example association procedure using association beamforming training (A-BFT) according to the present disclosure.

FIG. 6 illustrates an association procedure using A-BFT for IEEE 802.11ad according to this disclosure. The embodiment of the association procedure shown in FIG. 6 is for illustration only, and other association procedures in embodiments of the present disclosure could have the same or similar configuration.

FIG. 6 illustrates an example association procedure 600 using an association beamforming training (A-BFT) duration 602 of a beacon interval 604. In the A-BFT duration 602, time is divided into multiple association slots (called sector sweep slots or SSW slots) determined by the beacon (up to a maximum of 8 slots in IEEE 802.11ad). A SSW slot m 606 and a SSW slot n 608 are included in this embodiment. Each STA, such as nodes 610 (labeled STA i) and 612 (labeled STA j) randomly or pseudo-randomly picks one of the SSW slots 606 and 608 slots for transmission to the node 614 (labeled PCP/AP). The stations perform their own sector sweeps during the slot time where it transmits multiple SSW frames with different sector IDs. For example, node 612 performs a responder sector sweep 616 during the duration of the SSW slot m 606 and node 610 performs a responder sector sweep 618 during the duration of the SSW slot n 608. During the transmission of the responder sector sweep 616, the node 614 utilizes a quasi-omni antenna pattern or a wide beam 620 antenna pattern and the node 614 records the best sector to receive transmission from the node 616. The node 614 or PCP/AP then transmits and feeds back the best sector ID to the node 612 using a SSW feedback 622 while the node 612 utilizes a wide beam 624 antenna pattern. If there is a collision at the node 614, which is detected by lack of SSW feedback from the PCP/AP to the STA requesting association, the STA retries during the next beacon interval. During the SSW slot n 608, the above-described process is repeated, but between the node 610 and the node 614 utilizing the responder sector sweep 618, the wide beam 626, the sector sweep feedback 628, and the wide beam 630. It is clear that each node such as nodes 610 and 612 attempting to associate with node 614 takes a turn in attempting association and the attempt to associate occur sequentially within the A-BFT 602 using one SSW slot per node or STA attempting to associate.

Figure 7:
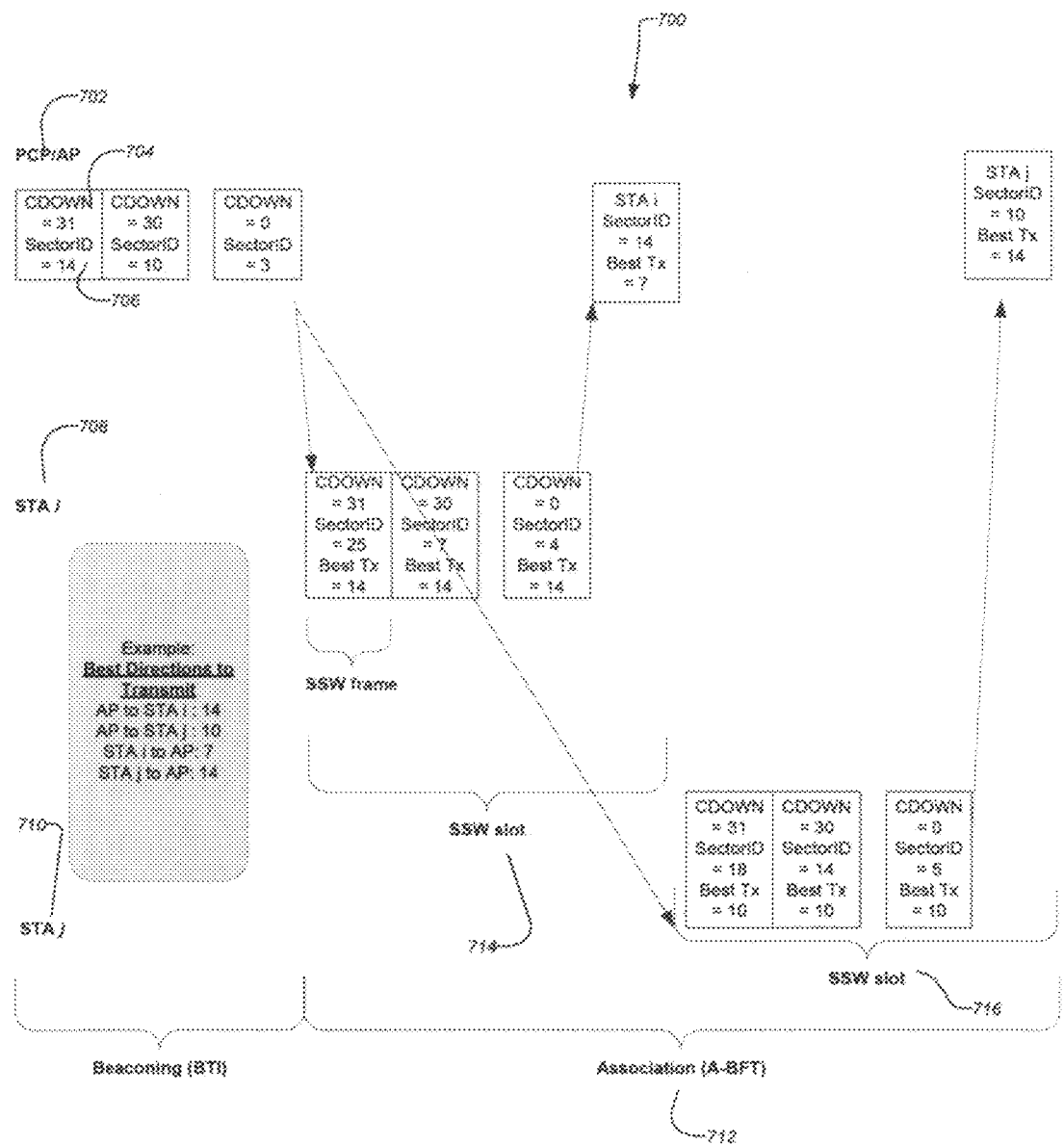
FIG. 7 illustrates an example sector sweep procedure according to the present disclosure.

FIG. 7 illustrates an example sector sweep procedure for association in IEEE 802.11ad according to this disclosure. The embodiment of the sector sweep procedure for association shown in FIG. 7 is for illustration only, and other sector sweep procedures for association in embodiments of the present disclosure could have the same or similar configuration.

FIG. 7 illustrates an example sector sweep procedure 700 for association in IEEE 802.11ad. The PCP/AP 702 transmits in multiple directions using a countdown (CDOWN) 704 reporting sector ID 706 during beacon transmissions. The STAs STA i 708 and STA j 710 are in a wide beam (e.g. quasi-omni) mode during this time and record the best transmit sector ID from the PCP/AP for reception. In this example, STA i 708 finds sector ID=14 from PCP/AP 702 while STA j 710 finds sector ID=10 as the best sector ID from the PCP/AP 702. During the A-BFT interval 712, STA i 708 finds the first transmission SSW slot 714 within the A-BFT 712 and STA j 710 finds the second transmission SSW slot 716 within the A-BFT 712. The PCP/AP 702 is in the wide beam (e.g. quasi-omni) mode during the first and second transmission SSW slots 716, 718. The PCP/AP 702 finds sector ID=7 as the best ID for STA i 708 and sector ID=14 as the best ID for STA j 710. Thus, at the end of the SSW, all STAs 708, 710 and the PCP/AP 702 know the best transmit sector ID. Table 1 below summarizes which best transmit sector IDs are transmitted during SLS for this example.

TABLE 1

| Transmission during SLS | Best transmit sector ID |
| --- | --- |
| PCP/AP to STA i | 14 |
| PCP/AP to STA j | 10 |
| STA i to PCP/AP | 7 |
| STA j to PCP/AP | 14 |

Embodiments of the present disclosure recognize that current association procedure specified in IEEE 802.11ad is sequential in that multiple users attach sequentially one after the other. Because there are only up to 8 slots in A-BFT, all STAs contend to use these slots. In each slot, the entire sector sweep (e.g., up to 128 sectors or up to 64 in case of a single DMG antenna) can be assigned to a single STA. Embodiments of the present disclosure recognize that such a sequential process can be extremely inefficient for association, particularly when a large number of STAs are present within the WLAN of the AP and requesting association. Embodiments of the present disclosure further recognize that only a few sectors (e.g., 1 or 2) within responder sector sweep are likely to be useful to communicate with the PCP/AP (e.g., owing to the directionality attributes observed at higher frequencies).

Figure 8:
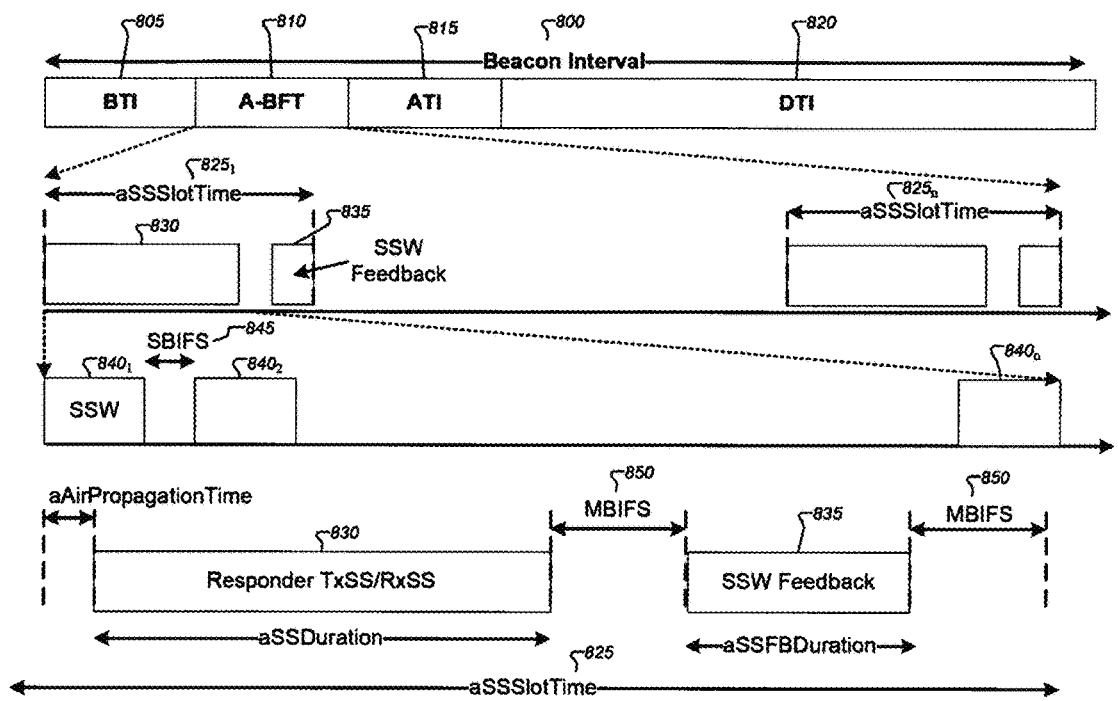
FIG. 8 illustrates an example A-BFT structure for association according to the present disclosure.

FIG. 8 illustrates an example A-BFT structure for association for IEEE 802.11ad. In this illustrative example, beacon interval (BI) 800 is a span of time between consecutive transmissions of a beacon transmission interval (BTI). The BI 800 begins with the BTI 805 and includes A-BFT duration 810, announcement transmission interval (ATI) 815, and data transmission interval (DTI) 820. As illustrated, the A-BFT duration 810 includes slots $825_1$ to $825_n$ (e.g., 8 slots in 802.11ad). The slots 825 each include a sector sweep duration 830 for STAs to perform sector sweeps and a feedback duration 835 for feedback from an AP. The sector sweep duration 830 includes several SSW frames $840_1$ to $840_n$ (e.g., up to 128 in 802.11ad) each separated by a Short Beamforming Inter-frame Spacing (SBIFS) 845 duration (e.g., of 1 μs in 802.11ad). As shown in greater detail, each slot 825 includes an air propagation time the sector sweep duration 830 for responder TX of sector sweep beams and RX of the transmitted beams, the SSW feedback duration 835, and two Medium Beamforming Inter-frame Spacing (MBIFS) 850 durations (e.g., of 9 μs in 802.11ad).

Embodiments of the present disclosure recognize that for improved success in association, particularly with a large number of STAs attempting association, efficiency of the use of the total time in the A-BFT 810 is important. A calculation of the total A-BFT time can be expressed according to equation 1 below.

$$\begin{aligned}\text{Total } A\text{-}BFT \text{ time} &= A\text{-}BFTLength * aSSSlotTime = \\ & A\text{-}BFTLength * (aAirPropagationTime + \\ & aSSDuration + aSSFBDuration + 2 * MBIFS) = \\ & A\text{-}BFTLength * (aAirPropagationTime + \\ & numSSWFrames * SSW + (numSSWFrames - 1) * \\ & SBIFS + aSSFBDuration + 2 * MBIFS)\end{aligned}$$ [Equation 1]

Figure 9:
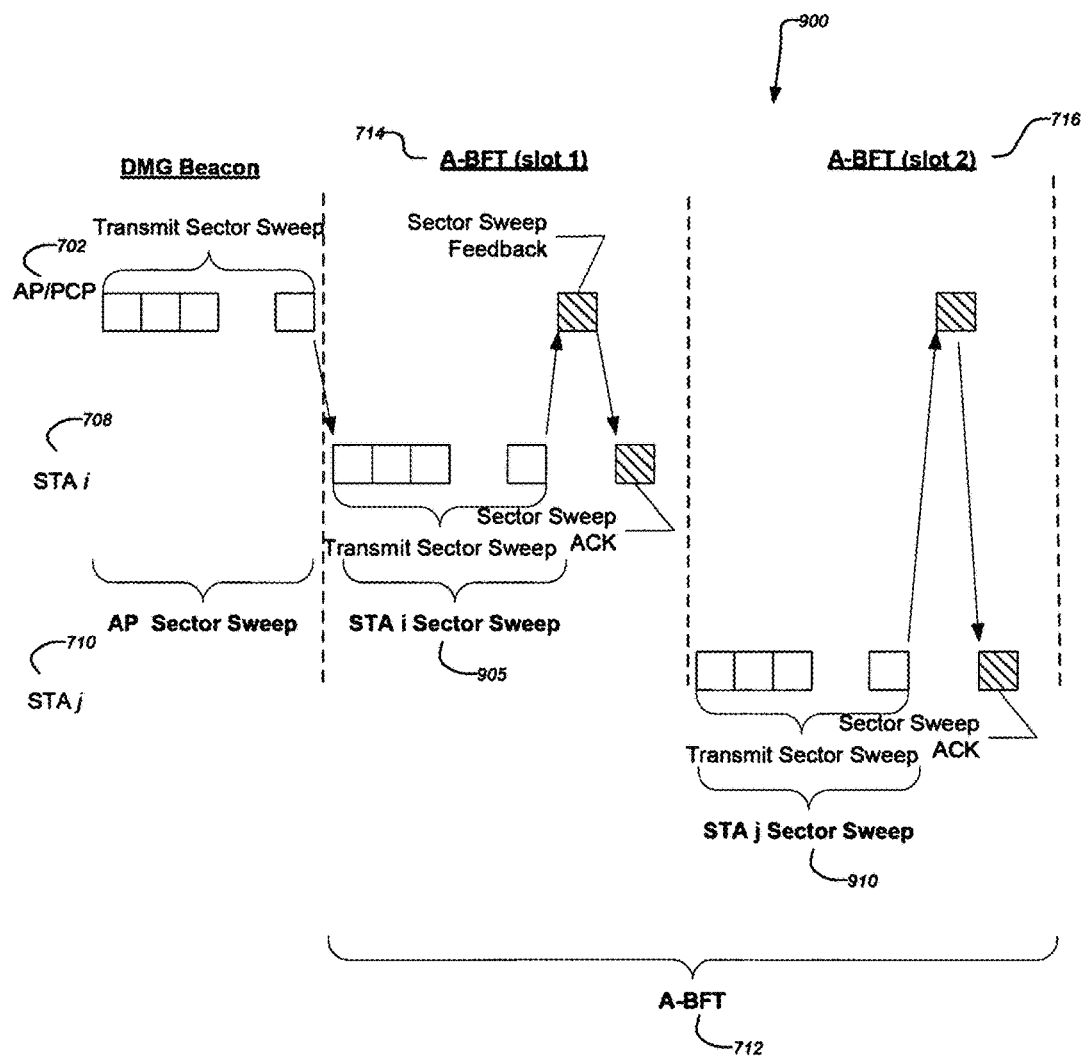
FIG. 9 illustrates an example sequential association procedure according to the present disclosure.

FIG. 9 illustrates an example sequential association procedure 900 for IEEE 802.11ad according to the present disclosure. The example sequential association procedure 900 is an example of one embodiment of the example sector sweep procedure in FIG. 7.

The STAs 708 and 710 select a random slot in the A-BFT 712 (for example, STAi 708 selects slot 714 for associating with the PCP/AP 702 and STA j 710 chooses slot 716). Within each slot, the entire sector sweep for the STA is completed. At each slot, a maximum of 1 STA can associate with the PCP/AP 702 due to the current structure in IEEE 802.11ad. As a result, the number of associations possible is restricted by the number of slots available in the A-BFT duration. Moreover, during association, the STAs are unaware of each other and are unable to coordinate for slot selection. Hence, the STAs may select the same slot, which may cause collisions and unsuccessful association. Thus, while it is theoretically possible for up to 8 STAs to successfully associate with the AP in a single A-BFT, in practice this number is often much lower.

Figure 10:
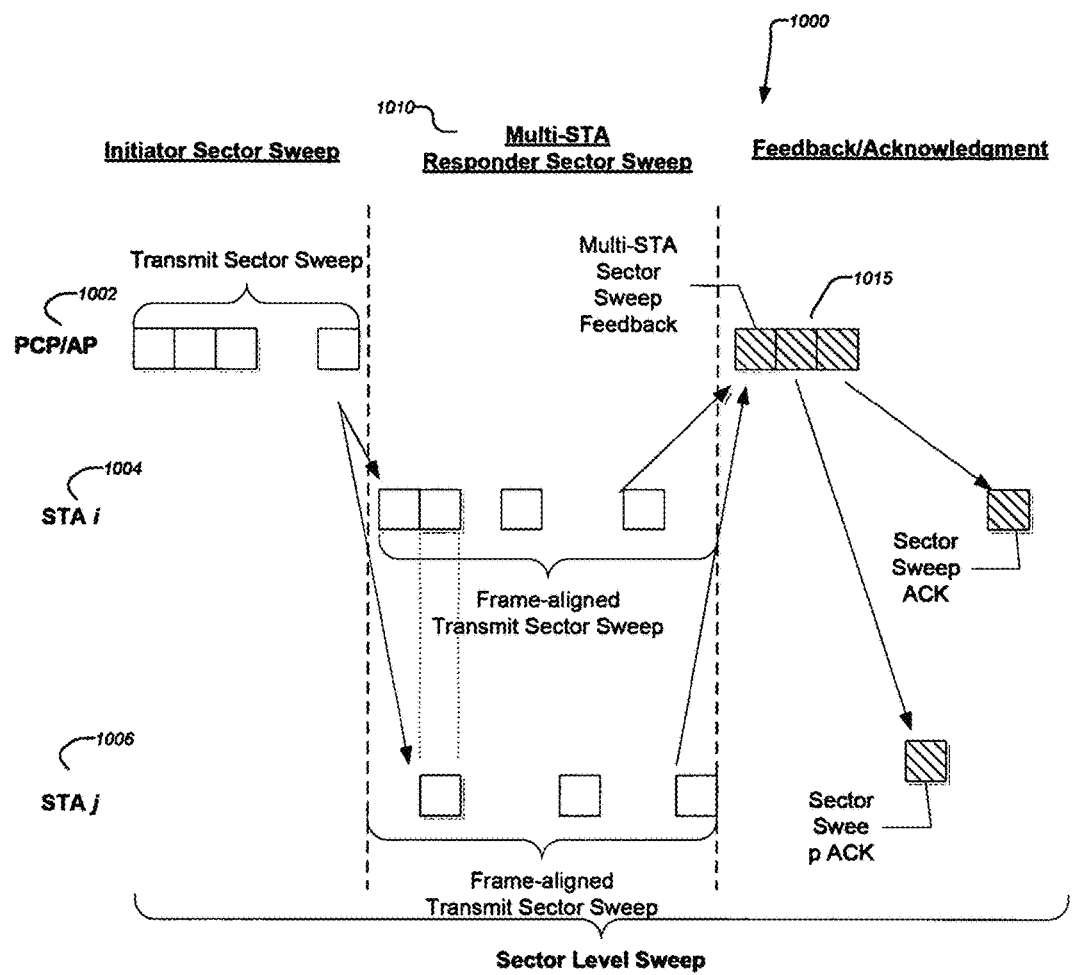
FIG. 10 illustrates an example fast association procedure during an A-BFT according to an illustrative embodiment of the present disclosure.

FIG. 10 illustrates an example fast association procedure 1000 during an A-BFT according to an illustrative embodiment of the present disclosure. The embodiment of the fast association procedure 1000 shown in FIG. 10 is for illustration only. Other embodiments could be used without departing from the scope of the present disclosure. For example, only two STAs are illustrated for brevity, while any number of STAs may be present and attempt association in the fast association procedure 1000.

Embodiments of the present disclosure provide for an increase in association success which ultimately leads to faster association, particularly when multiple STAs attempt association in a same A-BFT. For example, as illustrated, the STAs 1004 and 1006 transmit on SSW frame boundaries instead of SSW slot boundaries, thereby essentially eliminating the issues associated with the slot structure for association used in IEEE 802.11ad specification. In one or more embodiments, random and unique SSW frame start times are generated for the entire sweep duration 1010 by the associating STA. Multiple STAs 1004 and 1006 start at random times within the sector sweep duration 1010 with start times aligned at the SSW frame boundaries. The STAs 1004 and 1006 choose sector IDs randomly or pseudo-randomly for transmission. After the sector sweep duration 1010, the AP 10002 transmits a group sector sweep feedback message 1015, which can be listened for by all the contending STAs 1004 and 1006. The contending STAs listen for the feedback after the sector sweep duration 1010 has ended, as determined by the setting in the beacon, which informs the STAs 1004 and 1006 that they are now associated with the PCP/AP 10002. Embodiments of the present disclosure provide an advantage in a significant reduction in association time for a large number of STAs compared to existing known state of the art.

As illustrated, SSW transmissions by the STAs 1004 and 1006 overlap, but on SSW frame boundaries instead of slot boundaries. While some collisions may occur, the likelihood of collisions is low because few of the transmitted beams for association actually reach the AP. The STAs 1004 and 1006 randomly or pseudo-randomly distributing the SSW frames throughout the A-BFT interval allows for the likelihood of collisions to be further decreased. Additionally, the grouping the association feedback for the associated STAs can reduce the overall time used to perform association.

Figure 11:
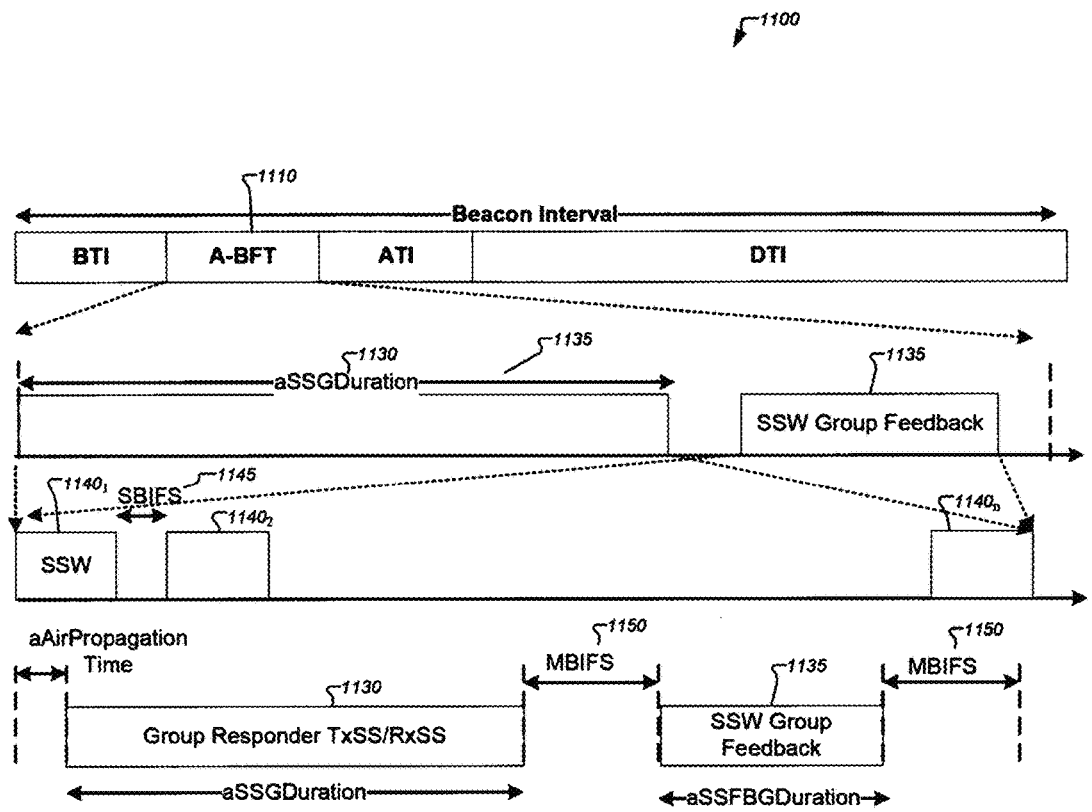
FIG. 11 illustrates an example A-BFT structure for fast association according to an illustrative embodiment of the present disclosure.

FIG. 11 illustrates an example A-BFT structure 1100 for fast association according to an illustrative embodiment of the present disclosure. The embodiment of the A-BET structure 1100 shown in FIG. 11 is for illustration only. Other embodiments could be used without departing from the scope of the present disclosure.

In this illustrative example, the A-BFT structure 1100, rather than slots, includes a sector sweep group duration 1130 for STAs to perform sector sweeps and a SSW group feedback duration 1135 for feedback from an AP. The sector sweep group duration 1130 includes several SSW frames 1140₁ to 1140ₙ each separated by a SBIFS duration 1145. As shown in greater detail, the entire length of A-BFT duration an air propagation time, the sector sweep group duration 830 for a group of multiple different responders to TX sector sweep beams and for the RX of the transmitted beams, the SSW group feedback duration 1135, and two MBIFS durations 1150.

In this example, the A-BFT duration includes fewer MBIFS durations 1150 than the slot based approach discussed above with regard to FIG. 8. For example, the A-BFT duration includes only two MBIFS durations 1150, one between the single sector sweep group duration 1130 and the grouped feedback duration 1135 and one after the grouped feedback duration 1135, rather than two MBIFS durations 850 per slot 825 (e.g., a total of 16 MBIFS durations in IEEE 802.11ad). A calculation of the total A-BFT time using the A-BFT structure 1100 can be expressed according to equation 2 below.

$$\text{Total } A\text{-}BFT \text{ time} = \quad \text{[Equation 2]}$$
$$aAirPropagationTime + aSSGDuration +$$
$$aSSFBGDuration + 2*MBIFS =$$
$$aAirPropagationTime + numSSWGFrames*SSW +$$
$$(numSSWGFrames - 1)*SBIFS +$$
$$aSSFBGDuration + 2*MBIFS =$$
$$aAirPropagationTime + numSSWGFrames*SSW +$$
$$(numSSWGFrames + numSSWFBFrames - 2)*$$
$$SBIFS + numSSWFBFrames*SSW + 2*MBIFS$$

where the total number of SSW frame boundary times available is denoted as numSSWGFrames (e.g., may be equivalent to A-BFTlength*numSSWFrames in IEEE 802.11ad for an equivalent time duration). The numSSWFrames may be determined by the value of the FSS sub-field of the beacon interval control field in the DMG beacon as described in the IEEE 802.11ad standard. The SSW group feedback duration 1135 is denoted as numSSWFBGFrames (e.g., may be equivalent to A-BFTlength in IEEE 802.11ad for an equivalent time duration).

Figure 12:
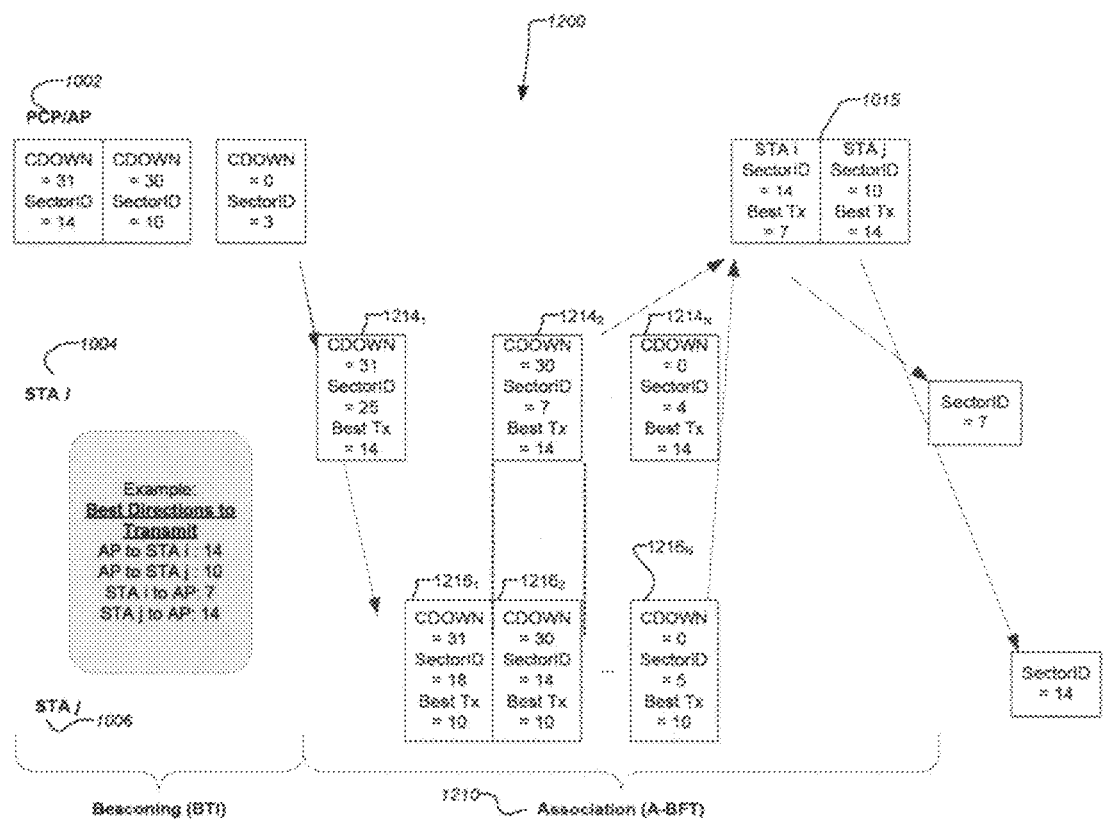
FIG. 12 illustrates an example of a fast association procedure according to an illustrative embodiment of the present disclosure.

FIG. 12 illustrates an example of a fast association procedure 1200 according to an illustrative embodiment of the present disclosure. The embodiment of the fast association procedure 1200 shown in FIG. 12 is for illustration only. Other embodiments could be used without departing from the scope of the present disclosure. The fast association procedure 1200 is an example of one embodiment of the fast association procedure 1000 in FIG. 10.

In this illustrative embodiment, the STAs 1004 and 1006 transmit association beams during an A-BFT duration 1210. As illustrated, the frames (1214₁ to 1314ₙ for STA 1004 and 1316₁ to 1316ₙ for STA 1006) used by the STAs 1004 and 1006 for the A-BFT are randomly or pseudo-randomly selected. For example, the STAs 1004 and 1006 may select a random start time within the A-BFT duration 1210 and transmit the beams in consecutive frames' as shown for the STA 1006 (e.g., 32 beams transmitted for A-BFT in this example) or non-consecutive frames as shown for the STA 1004. In another example, the frames are randomly selected by the STAs, which is achieved by randomly or pseudo-randomly selecting the number and/or ordering sector IDs where the beams are transmitted. The AP 1002 provides grouped feedback 1015 to the STAs 1004 and 1006. The feedback includes an indicator of the sector ID of the AP 1002 preferred or best beam (e.g., sector ID 7 for STA 1004 and sector ID 14 for STA 1006). The AP 1002 can transmit the grouped feedback 1015 to the STAs 1004 and 1006 in the direction the preferred or best beam was received from. For example, the AP 1002 may transmit the grouped association feedback to multiple STAs simultaneously using spatial multiplexing. This can further reduce the duration of time needed to provide association feedback to the STAs, which may allow for a longer A-BFT duration 1210 to provide the STAs with additional opportunities and/or allow for additional STAs to associate.

In one embodiment, the STAs 1004 and 1006 may repeat sector IDs within the A-BFT 1210 duration for transmission to the AP 1002. This will allow STAs to have more opportunities to access the AP 1002 and can further reduce the chances of collision due to overlapping frames. In one example, prior association sector IDs from past connection history, can also be used or repeated to try to improve association probability and/or reduce association time by restricting the number of sectors used during the association search.

Figure 13:
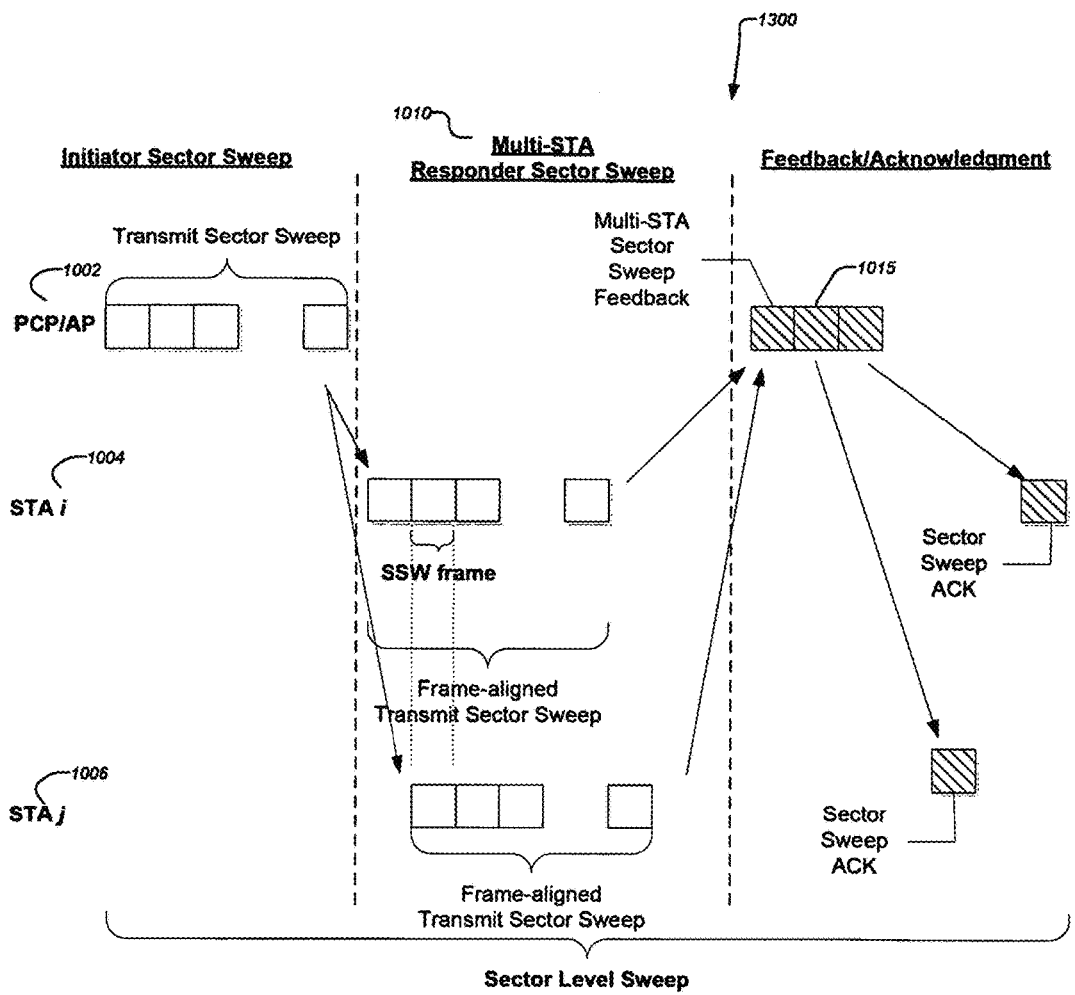
FIG. 13 illustrates an example fast association procedure with sector sweep (SSW) frames that are contiguous and overlapped on frame boundaries according to an illustrative embodiment of the present disclosure.

FIG. 13 illustrates an example fast association procedure 1300 with SSW frames that are contiguous and overlapped on frame boundaries according to an illustrative embodiment of the present disclosure. The embodiment of the fast association procedure 1300 shown in FIG. 13 is for illustration only. Other embodiments could be used without departing from the scope of the present disclosure. The fast association procedure 1300 is an example of one embodiment of the fast association procedure 1000 in FIG. 10. However, in this embodiment, the per STA SSW frames for A-BFT are still contiguous similarly to IEEE 802.11ad but are started at a random frame-aligned start time instead of at a slot time.

Figure 14:
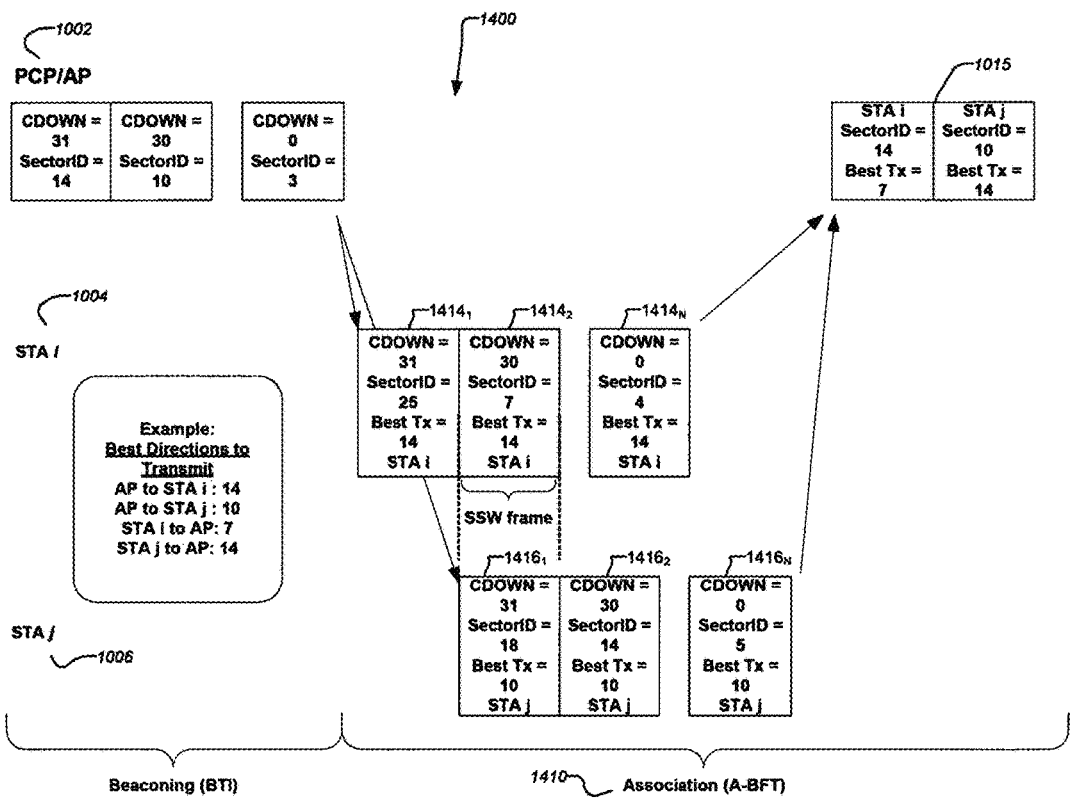
FIG. 14 illustrates an example of the fast association procedure illustrated in FIG. 13 according to an illustrative embodiment of the present disclosure.

FIG. 14 illustrates an example of the fast association procedure illustrated in FIG. 13 according to an illustrative embodiment of the present disclosure. The embodiment of the fast association procedure 1400 shown in FIG. 14 is for illustration only. Other embodiments could be used without departing from the scope of the present disclosure. The fast association procedure 1400 is an example of one embodiment of the fast association procedure 1300 in FIG. 13.

In this illustrative embodiment, the STAs 1004 and 1006 transmit association beams during the A-BFT duration 1410. As illustrated, the per STA SSW frames ($1414_1$ to $1414_n$ for STA 1004 and $1416_1$ to $1416_n$ for STA 1006) for A-BFT are still contiguous similarly to IEEE 802.11ad but are started at a random frame-aligned start time instead of at a slot time Various association testing for the fast association methods described herein validates the improvement in association, particularly in instances where the number of STAs attempting association is large, such as 8 or more STAs, for example. For example, in IEEE 802.11ad, if there is a slot time collision where multiple STAs get same slot, even if 1 frame of any 1 STA gets through in the SSW due to directionality, one of the STAs among the multiple STAs who got through can now associate in that slot. According to an embodiment of the present disclosure, an STA randomly schedules SSW frames in total time allocated for association (non-contiguous). If there is a frame time collision among multiple STAs, if frame of any STA gets through due to directionality, that STA is designated as associated.

In certain embodiments, performing fast association at frame boundaries, as opposed to restricting those to slot boundaries may not be backwards compatible and may lead to co-existence issues with legacy STAs. One or more embodiments of the present disclosure provide a backward compatible scheme to accomplish fast association without compromising legacy performance. One or more embodiments of the present disclosure also provide features that can be embedded in the MAC management frames to facilitate/negotiate the usage of the (fast) association intervals.

Figure 15:
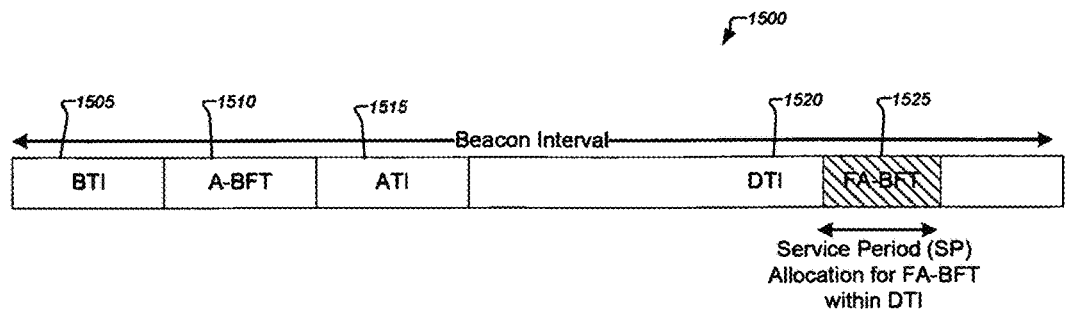
FIG. 15 illustrates an example frame structure including a fast-association beamforming training (FA-BFT) in a data transmission interval (DTI) for enabling fast association in a backward compatible manner according to an illustrative embodiment of the present disclosure.

FIG. 15 illustrates an example frame structure 1500 including an FA-BFT 1525 in DTI 1520 for enabling fast association in a backward compatible manner according to an illustrative embodiment of the present disclosure. The embodiment of the frame structure 1500 including shown in FIG. 15 is for illustration only. Other embodiments could be used without departing from the scope of the present disclosure.

In this embodiment, support for fast association is enabled in a backward compatible manner by the AP allocating or carving out time intervals, specifically dedicated to fast association (FA), i.e., FA-BFT 1525. As an example, these FA intervals can be placed in the DTI duration 1520 by using a dedicated service period (SP). For example, the indication of the existence of such period and its duration can be indicated in the BTI 1505 or the ATI 1515. As depicted, the FA-BFT 1525 may be included in the DTI 1520 instead of using the A-BFT 1510; thus preserving backwards compatibility for STAs desiring to use a slot based association in the A-BFT 1510.

The fast association period (denoted as FA-BFT 1525) can be announced in the BTI 1505 or ATI 1515 by the AP. New STAs that receive the beacon can use the FA-BFT period 1625 for association instead of the A-BFT period 1510. The amount of time to be allocated for FA-BFT 1525 can be configured on a dynamic basis. For example, a certain number of time-slots, up to a maximum of N slots, can be assigned for FA-BFT 1525. The allocation of the FA-BFT 1525 can start conservatively (for example, 1 slot period). Based on the AP's view of congestion in the network such as the number of collisions seen and the number of devices that are using the FA-BFT period 1525, the AP may decide to increase the number of time slots allocated for FA-BFT 1525.

Figure 16:
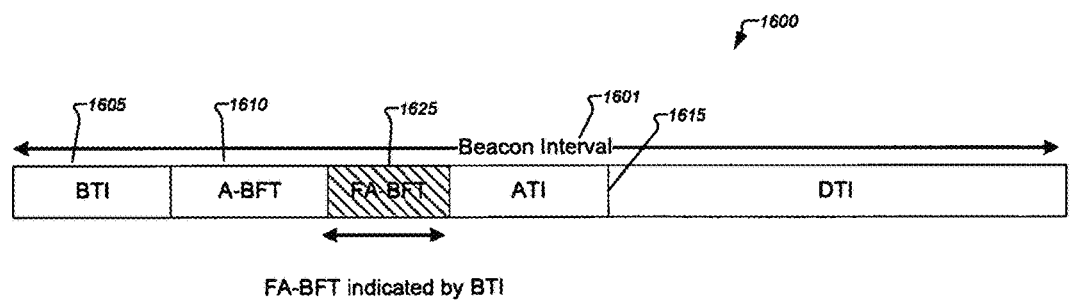
FIG. 16 illustrates an example frame structure including an FA-BFT period in beacon interval for enabling fast association in a backward compatible manner according to an illustrative embodiment of the present disclosure.

FIG. 16 illustrates an example frame structure 1600 including an FA-BFT period 1625 in beacon interval 1601 for enabling fast association in a backward compatible manner according to an illustrative embodiment of the present disclosure. The embodiment of the frame structure 1600 including shown in FIG. 16 is for illustration only. Other embodiments could be used without departing from the scope of the present disclosure.

In this embodiment, the FA-BFT period 1625 can be defined by the BTI 1605 as a separate period in the beacon interval 1601. This period could be scheduled after the A-BFT 1610 (to continue the association process) or after the ATI 1615. In some embodiments, the FA-BFT 1625 may not be scheduled every beacon interval. The FA-BFT period 1625 could be indicated by using new or reserved fields in the existing beacon frame structure.

Figure 17:
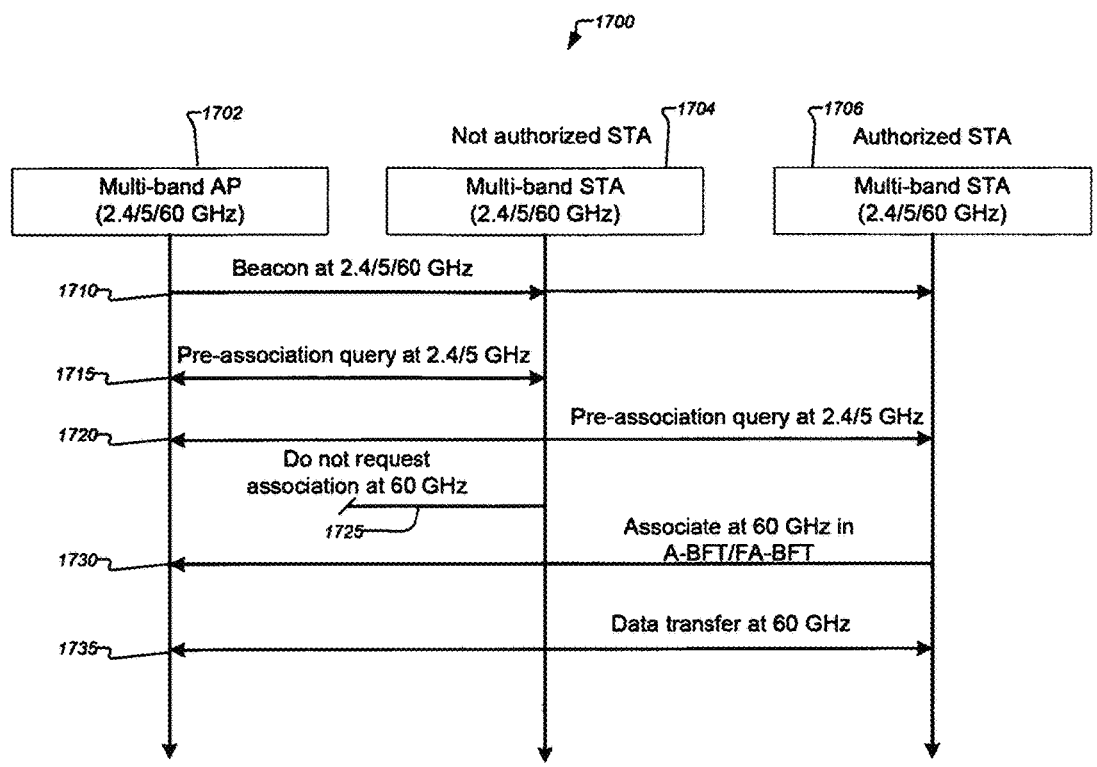
FIG. 17 illustrates an example process for using pre-association to reduce contention during association according to an illustrative embodiment of the present disclosure.

FIG. 17 illustrates an example process 1700 for using pre-association to reduce contention during association according to an illustrative embodiment of the present disclosure. The embodiment of the process 1700 including shown in FIG. 17 is for illustration only. Other embodiments could be used without departing from the scope of the present disclosure.

In this illustrative embodiment, the AP 1702 supports multiple frequency bands such as, for example, two or more of the 2.4 GHz, 5 GHz, and 60 GHz bands and may support multiple protocols such as, for example, IEEE 802.11u and IEEE 802.11ad. IEEE 802.11u supports advanced features for Network discovery and selection (NDS). IEEE 802.11u provides Generic Advertisement Service (GAS) messages along with Access Network Query Protocol (ANQP) and the Interworking element provide lightweight support for network selection. GAS provides support for other higher-layer network discovery, service advertisement and mobility management protocols. If the STAs 1704 and 1706 also support both IEEE 802.11u and IEEE 802.11ad services, the STAs 1704 and 1706 can query the AP in the lower frequency bands (e.g., the 2.4 or 5 GHz bands) to see if the STAs 1704 and 1706 wants to associate this network at 60 GHz. By associating only when the AP is one in which the STAs 1704 and 1706 intended to associate with, the STAs 1704 and 1706 can reduce power and reduce contention at the AP 1702 during association. For example, the upper layer protocol exchanges for establishing credentials for authentication and setting up the device discovery protocols can happen at lower frequencies (e.g., the 2.4 or 5 GHz bands). The move to 60 GHz can then happen either independently or using techniques such as a fast session transfer (FST) supported in IEEE 802.11ad.

As illustrated, the multi-band AP 1702 beacons at low and high frequencies (step 1710). The multi-band STAs 1704 and 1706 query the AP 1702 prior to association at low frequencies to see if the AP will admit the STA and check the authorization (steps 1715 and 1720). If not authorized, the STA 1704 will not send any association requests in the A-BFT period (step 1725), thereby reducing contention at the AP and saving power. Authorized STA 1706 can associate and contend in the A-BFT/FA-BFT periods (step 1730) and transfer high-speed data at 60 GHz (step 1735).

Figure 18:
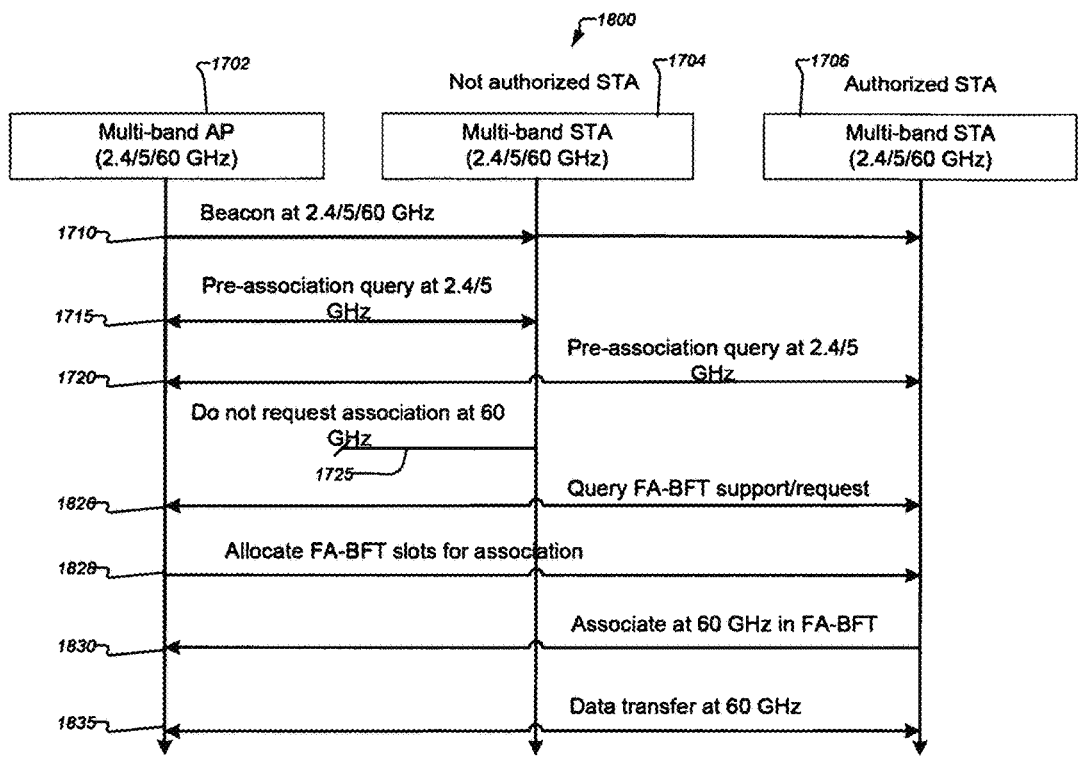
FIG. 18 illustrates an example flow diagram for FA-BFT query message exchange according to an illustrative embodiment of the present disclosure.

FIG. 18 illustrates an example process 1800 for FA-BFT query message exchange according to an illustrative embodiment of the present disclosure. The embodiment of the process 1800 including shown in FIG. 18 is for illustration only. Other embodiments could be used without departing from the scope of the present disclosure.

In this illustrative embodiment, the process 1700 in FIG. 17 may be modified based on whether the IEEE 802.11u protocol can also supported at mmWave frequencies such as 60 GHz. If the IEEE 802.11u protocol is also supported at mmWave frequencies, the STA 1706 can make a query for fast association capability at the AP 1702 and a request can be made to use this feature (step 1830). If such a capability exists, the AP 1702 can allocate or provide slots of time for fast association upon request (step 1828) for example, via IEEE 802.11u. For example, the beacon interval may indicate the presence of the FA-BFT period 1525 or 1625 being allocated as discussed above with regard to FIGS. 15 and 16. The STA 1706 can then associate using FA-BFT 1830 and transfer data at high speeds using FA-BFT 1835.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus for association by a station (STA) in a beamformed wireless area network (WLAN), the apparatus comprising:
a controller configured to:
randomly select sector sweep frames for association beam transmission from among a plurality of sector sweep frames within a frame-aligned transmit sector sweep duration, the frame-aligned transmit sector sweep duration present in an association beamforming training duration of a beacon interval, the plurality of sector sweep frames aligned in time within the frame-aligned transmit sector sweep duration; and
select a plurality of sector identifiers among previously selected sector identifiers from a past connection history; and a transceiver configured to:
transmit beams corresponding to the selected plurality of sector identifiers in each of the randomly selected sector sweep frames; and
receive sector sweep feedback from an access point (AP).

2. The apparatus of claim 1, wherein:
the controller is configured to randomly select a first of the sector sweep frames to transmit in during the association beamforming training duration, and
the other sector sweep frames are consecutive following the first sector sweep frame.

3. The apparatus of claim 1, wherein the transceiver is configured to transmit more than one beam in a same direction identified by different selections of the randomly selected sector sweep frames.

4. The apparatus of claim 1, wherein the association beamforming training duration is a fast association beamforming training duration in a data transmission interval of the beacon interval.

5. The apparatus of claim 1, wherein the controller is configured to:
determine whether the STA is authorized to access the AP based on messages transmitted using at least one existing WLAN frequency bands below 6 GHz; and
perform the association in a millimeter wave band in response to determining that the STA is authorized to access the AP.

6. The apparatus of claim 1, wherein the association beamforming training duration of the beacon interval includes only one inter-frame spacing duration separating responder sector sweeps from STAs and sector sweep group feedback from the AP.

7. An apparatus for association by an access point (AP) in a beamformed wireless area network (WLAN), the apparatus comprising:
a transceiver configured to receive at least one transmission from one or more stations (STAs) on at least one of randomly selected sector sweep frames from among a plurality of sector sweep frames within a frame-aligned transmit sector sweep duration, the frame-aligned transmit sector sweep duration present in an association beamforming training duration of a beacon interval, the plurality of sector sweep frames aligned in time within the frame-aligned transmit sector sweep duration; and
a controller configured to select a sector identifier for transmissions from each of the one or more STAs based on the at least one received transmission,
wherein the transceiver is further configured to transmit, to the one or more STAs, grouped sector sweep feedback indicating the selected sector identifier for transmissions from each of the one or more STAs; and
wherein the at least one transmission corresponds to a plurality of sector identifiers selected among previously selected sector identifiers from a past connection history of one or more STAs.

8. The apparatus of claim 7, wherein the grouped sector sweep feedback indicating the selected sector identifier for the selected transmission from each of the one or more STAs is transmitted by the AP to the one or more STAs in directions from where the at least one transmission from corresponding ones of the one or more STAs were received by the AP.

9. The apparatus of claim 7, wherein the association beamforming training duration is a fast association beamforming training duration in a data transmission interval of the beacon interval.

10. The apparatus of claim 7, wherein the controller is configured to:
perform a pre-association procedure for identification of whether the one or more STAs are authorized to access the AP based on messages transmitted using at least one existing WLAN frequency bands below 6 GHz; and
perform the association in a millimeter wave band when the one or more STAs are authorized to access the AP.

11. The apparatus of claim 7, wherein the association beamforming training duration of the beacon interval includes only one inter-frame spacing duration separating responder sector sweeps from STAs and sector sweep group feedback from the AP.

12. The apparatus of claim 7, wherein the controller is configured to identify a number of fast association beamforming STAs present in the WLAN and reduce a duration of a legacy association beamforming training duration of the beacon interval based on the identified number of fast association beamforming STAs present in the WLAN.

13. A method for association by a station (STA) in a beamformed wireless area network (WLAN), the method comprising:
randomly selecting sector sweep frames for association beam transmission from among a plurality of sector sweep frames within a frame-aligned transmit sector sweep duration, the frame-aligned transmit sector sweep duration present in an association beamforming training duration of a beacon interval, the plurality of sector sweep frames aligned in time within the frame-aligned transmit sector sweep duration;
selecting a plurality of sector identifiers among previously selected sector identifiers from a past connection history;
transmitting beams corresponding to the selected plurality of sector identifiers in each of the randomly selected sector sweep frames; and
receiving sector sweep feedback from an access point (AP).

14. The method of claim 13, wherein:
randomly selecting the plurality of sector sweep frames in the frame-aligned transmit sector sweep duration comprises randomly selecting a first of the sector sweep frames to transmit in during the association beamforming training duration, and
the other sector sweep frames are consecutive following the first sector sweep frame.

15. The method of claim 13, wherein transmitting beams corresponding to the plurality of sector identifiers in each of the randomly selected sector sweep frames comprises transmitting more than one beam in a same direction identified by different selections of the randomly selected sector sweep frames.

16. The method of claim 13, wherein the association beamforming training duration is a fast association beamforming training duration in a data transmission interval of the beacon interval.

17. The method of claim 13, further comprising:
determining whether the STA is authorized to access the AP based on messages transmitted using at least one existing WLAN frequency bands below 6 GHz; and
performing the association in a millimeter wave band in response to determining that the STA is authorized to access the AP.

18. The method of claim 13, wherein the association beamforming training duration of the beacon interval includes only one inter-frame spacing duration separating responder sector sweeps from STAs and sector sweep group feedback from the AP.

* * * * *